United States Patent
Rapetti et al.

(10) Patent No.: US 11,326,383 B2
(45) Date of Patent: May 10, 2022

(54) GLOVE BOX ACTUATOR FOR POWER OPENING AND RELEASE

(71) Applicant: Inteva Products, LLC, Troy, MI (US)

(72) Inventors: Gabriel O. Rapetti, Rochester Hills, MI (US); Kenneth D. Snow, Chesterfield, MI (US); Ian J. Dow, Bloomfield, MI (US); Christopher Matthew Radjewski, Macomb, MI (US); Donald Michael Perkins, Warren, MI (US)

(73) Assignee: INTEVA PRODUCTS LLC, Troy, MI (US)

( * ) Notice: Subject to any disclaimer, the term of this patent is extended or adjusted under 35 U.S.C. 154(b) by 2 days.

(21) Appl. No.: 16/966,333

(22) PCT Filed: Feb. 1, 2019

(86) PCT No.: PCT/US2019/016306
§ 371 (c)(1),
(2) Date: Jul. 30, 2020

(87) PCT Pub. No.: WO2019/152814
PCT Pub. Date: Aug. 8, 2019

(65) Prior Publication Data
US 2020/0370356 A1    Nov. 26, 2020

Related U.S. Application Data

(60) Provisional application No. 62/670,394, filed on May 11, 2018, provisional application No. 62/626,454, filed on Feb. 5, 2018.

(30) Foreign Application Priority Data

May 11, 2018    (FR) ...................................... 1853990

(51) Int. Cl.
*E05F 15/00*    (2015.01)
*B60R 7/04*    (2006.01)

(52) U.S. Cl.
CPC ................ *E05F 15/00* (2013.01); *B60R 7/04* (2013.01); *E05Y 2201/43* (2013.01);
(Continued)

(58) Field of Classification Search
CPC ...... E05F 15/00; B60R 7/04; E05Y 2900/538; E05Y 2201/716; E05Y 2201/654
(Continued)

(56) References Cited

U.S. PATENT DOCUMENTS 5,558,385 A *   9/1996  Gross ........................ B60R 7/06
                                                       296/37.12
6,050,628 A *   4/2000  Allison ..................... B60R 7/06
                                                       224/281

(Continued)

FOREIGN PATENT DOCUMENTS

KR        100173660 B1    10/1999

OTHER PUBLICATIONS

French Office Action; International Application No. 18/53990; International Filing Date: May 11, 2018; dated Aug. 27, 2018; 1 page.

(Continued)

*Primary Examiner* — D Glenn Dayoan
*Assistant Examiner* — E Turner Hicks
(74) *Attorney, Agent, or Firm* — Cantor Colburn LLP

(57) ABSTRACT

A glove box assembly includes a glove box housing and a glove box door movable between a first, closed position and a second, open position relative to the glove box housing to selectively provide access to an interior of the glove box housing. An actuation system is connected to the glove box door and a control mechanism is operably coupled to the (Continued)

actuation mechanism. The actuation mechanism is operable in response to the control mechanism to move the glove box door to one of the closed position or the open position.

20 Claims, 8 Drawing Sheets

(52) U.S. Cl.
CPC ... *E05Y 2201/654* (2013.01); *E05Y 2201/716* (2013.01); *E05Y 2900/538* (2013.01)

(58) Field of Classification Search
USPC .................................. 296/37.12, 37.1, 37.8
See application file for complete search history.

(56) References Cited

U.S. PATENT DOCUMENTS

| | | | | |
|---|---|---|---|---|
| 7,121,605 | B2 * | 10/2006 | DePue | B60R 7/06 |
| | | | | 296/37.12 |
| 7,500,704 | B2 * | 3/2009 | Herrera | B60R 7/06 |
| | | | | 296/37.12 |
| 7,878,035 | B2 * | 2/2011 | Yamaguchi | B60R 7/06 |
| | | | | 70/161 |
| 8,840,165 | B2 * | 9/2014 | Park | B60R 7/06 |
| | | | | 296/37.12 |
| 9,566,912 | B2 * | 2/2017 | Shami | E05F 15/79 |
| 9,863,171 | B1 | 1/2018 | Salter et al. | |
| 10,781,612 | B2 * | 9/2020 | Ketels | E05B 15/04 |
| 10,822,861 | B2 * | 11/2020 | Ottolini | B60R 7/06 |
| 11,104,364 | B1 * | 8/2021 | Kinzler | B62B 5/0414 |
| 2008/0007081 | A1 * | 1/2008 | Shibata | E05B 47/0009 |
| | | | | 296/37.12 |
| 2013/0154297 | A1 * | 6/2013 | Doll | B60R 7/06 |
| | | | | 296/37.8 |
| 2015/0360616 | A1 * | 12/2015 | Shami | B60R 7/06 |
| | | | | 296/37.8 |
| 2019/0153769 | A1 * | 5/2019 | Ottolini | E05F 15/70 |
| 2020/0017031 | A1 * | 1/2020 | Bauernfeind | B60R 7/005 |

OTHER PUBLICATIONS

International Search Report; International Application No. PCT/US2019/016306; International Filing Date: Feb. 1, 2019; dated May 16, 2019; 4 pages.
Preliminary Search Report; International Application No. 18/53990; International Filing Date: May 11, 2018; dated Mar. 11, 2020; 1 page.
Written Opinion of the International Searching Authority; International Application No. PCT/US2019/016306; International Filing Date: Feb. 1, 2019; dated May 16, 2019; 4 pages.
Written Opinion; International Application No. 18/53990; International Filing Date: May 11, 2018; dated Mar. 11, 2020; 4 pages.

* cited by examiner

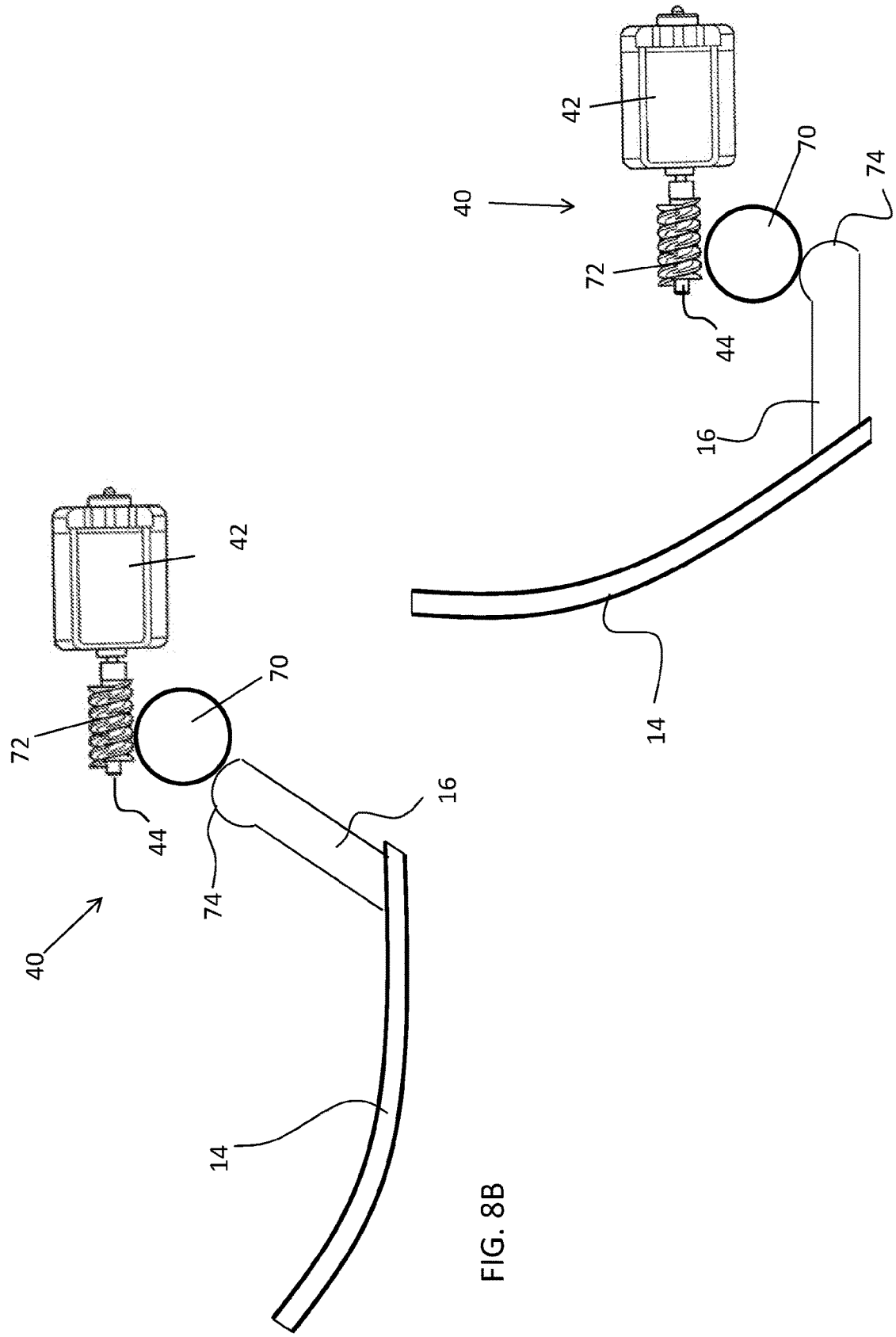

GLOVE BOX ACTUATOR FOR POWER OPENING AND RELEASE

CROSS REFERENCE TO RELATED APPLICATIONS

This application is a National Stage application of PCT/US2019/016306 filed Feb. 1, 2019, which claims priority to U.S. Provisional application 62/670,394 filed May 11, 2018 and FR application 18/53990 filed May 11, 2018, which claim priority to U.S. Provisional application 62/626,454 filed Feb. 5, 2018, all of which are incorporated by reference in its entirety herein.

TECHNICAL FIELD

Embodiments of the present disclosure relate to door and movable panels, and more particularly to an actuation system of a glove box assembly for vehicles.

BACKGROUND

Typically, a mechanism for operating a vehicle glove box includes mechanical device. Examples of the mechanical device can include either a simple single retracting pawl or a more modern dual side pawl. However, with improvements in vehicle technology, it is desirable to fully automate operation of a vehicle glove box, including not only opening, but also closing of the glove box.

SUMMARY OF THE INVENTION

According to an embodiment, a glove box assembly includes a glove box housing and a glove box door movable between a first, closed position and a second, open position relative to the glove box housing to selectively provide access to an interior of the glove box housing. An actuation system is connected to the glove box door and a control mechanism is operably coupled to the actuation mechanism. The actuation mechanism is operable in response to the control mechanism to move the glove box door to one of the closed position or the open position.

In addition to one or more of the features described above, or as an alternative, in further embodiments the actuation system further comprises: a prime move and a coupling connecting a portion of the glove box door to the prime mover.

In addition to one or more of the features described above, or as an alternative, in further embodiments the portion of the glove box door is a glove box arm.

In addition to one or more of the features described above, or as an alternative, in further embodiments the coupling further comprises a gear train intermeshed with a feature formed in the portion of the glove box door.

In addition to one or more of the features described above, or as an alternative, in further embodiments the coupling further comprises: a drum driven about an axis of rotation by the prime mover and at least one cable connected to the rotatable drum. An unwound portion of the at least one cable extending between the drum and the glove box door is adjusted as the drum rotates between the first position and the second position.

In addition to one or more of the features described above, or as an alternative, in further embodiments comprising a gear train extending between the drum and the prime mover.

In addition to one or more of the features described above, or as an alternative, in further embodiments an end of the at least one cable includes a loop positioned about a post protruding from the glove box arm.

In addition to one or more of the features described above, or as an alternative, in further embodiments comprising a conduit surrounding at least a portion of the at least one cable.

In addition to one or more of the features described above, or as an alternative, in further embodiments the conduit is fixed and the at least one cable is movable relative to the conduit.

In addition to one or more of the features described above, or as an alternative, in further embodiments as the drum rotates in a first direction, the at least one cable is wound about the drum, and the glove box door is moved towards the first, closed position.

In addition to one or more of the features described above, or as an alternative, in further embodiments the at least one cable is received within a groove formed in the outer periphery of the drum.

In addition to one or more of the features described above, or as an alternative, in further embodiments as the drum rotates in a second direction, the at least one cable is unwound from the drum, and the glove box door is moved towards the second, open position.

In addition to one or more of the features described above, or as an alternative, in further embodiments the coupling further comprises: a pinion gear driven by the prime mover and at least one push pull cable engaged with the pinion gear. Operation of the prime mover rotates the pinion gear such that the at least one push pull cable extending is adjusted between a first position and a second position.

In addition to one or more of the features described above, or as an alternative, in further embodiments comprising a sensor for detecting manual movement of the glove box door.

In addition to one or more of the features described above, or as an alternative, in further embodiments the sensor includes a tension sensor operably coupled to at least one of the prime mover and the coupling connecting the portion of the glove box door to the prime mover.

In addition to one or more of the features described above, or as an alternative, in further embodiments the sensor is mounted to the glove box door.

In addition to one or more of the features described above, or as an alternative, in further embodiments operation of the actuation system is initiated in response to movement of the glove box door detected by the sensor.

According to another embodiment, a method of operating a glove box assembly includes generating a signal to transform a glove box door of the glove box assembly between an open position and a closed position, operating a prime mover of an actuation system in response to the signal, and adjusting a force applied by a coupling extending between the prime mover and the glove box door to transform the glove box door to one of the open position and the closed position.

In addition to one or more of the features described above, or as an alternative, in further embodiments adjusting the force applied by the coupling extending between the prime mover and the glove box door further comprises rotating a drum to adjust a length of at least one cable extending between the drum and the glove box door of the glove box assembly.

In addition to one or more of the features described above, or as an alternative, in further embodiments rotating the drum via operation of the prime mover in a first direction increases a length of the at least one cable extending between the drum and the glove box door causing the glove box door to transition from a closed position to an open position.

In addition to one or more of the features described above, or as an alternative, in further embodiments rotating the drum via operation of the prime mover in a second direction shortens the length of the at least one cable extending between the drum and the glove box door causing the glove box door to transition from the open position to a closed position.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which:

FIG. 8A is a side view of an actuation system of the glove box assembly according to an embodiment; and FIG. 8B is a side view of an actuation system of the glove box assembly according to an embodiment.

DETAILED DESCRIPTION

Figure 1:
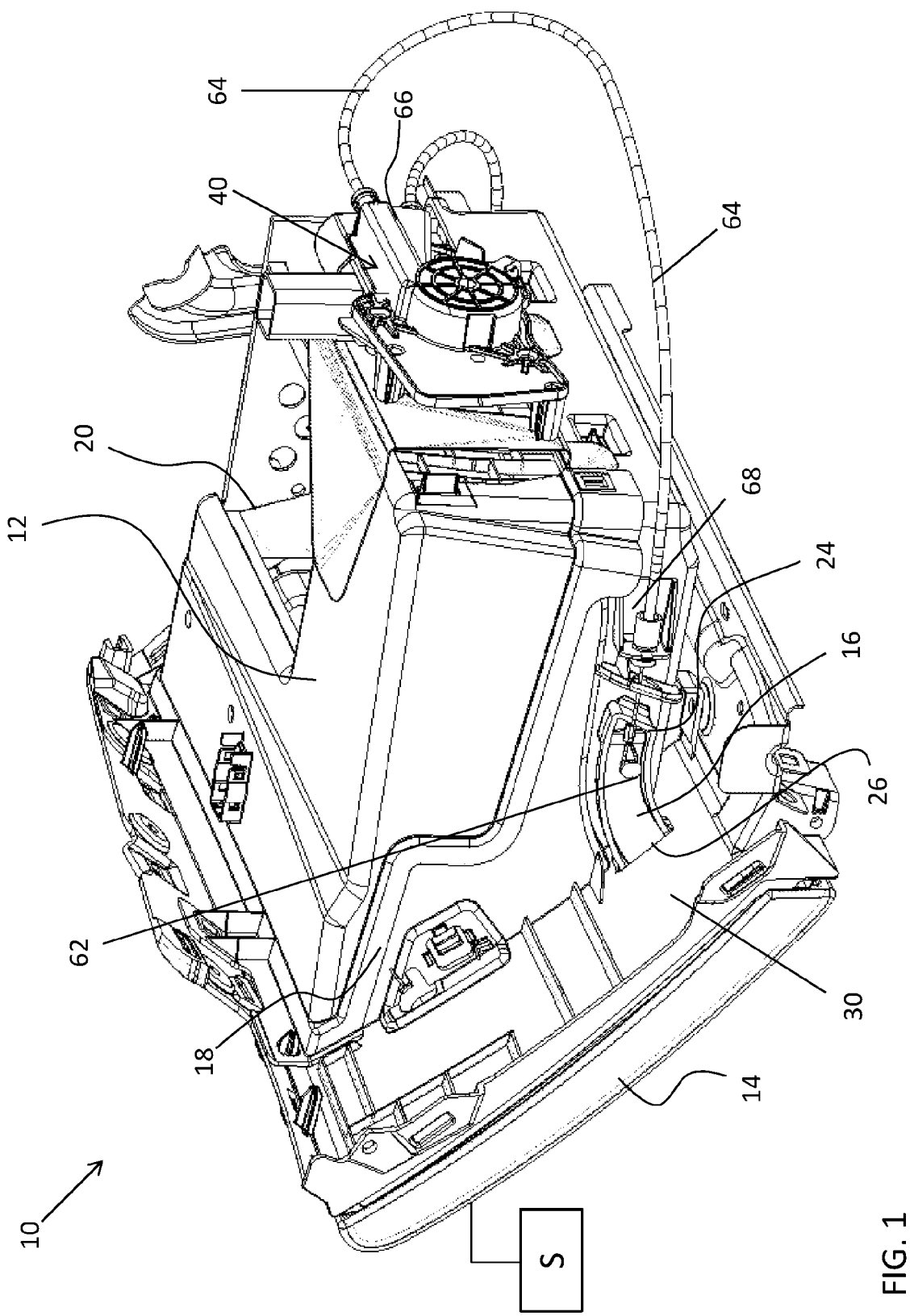
FIG. 1 is a rear perspective view of a glove box assembly in a closed configuration according to an embodiment.
Figure 2:
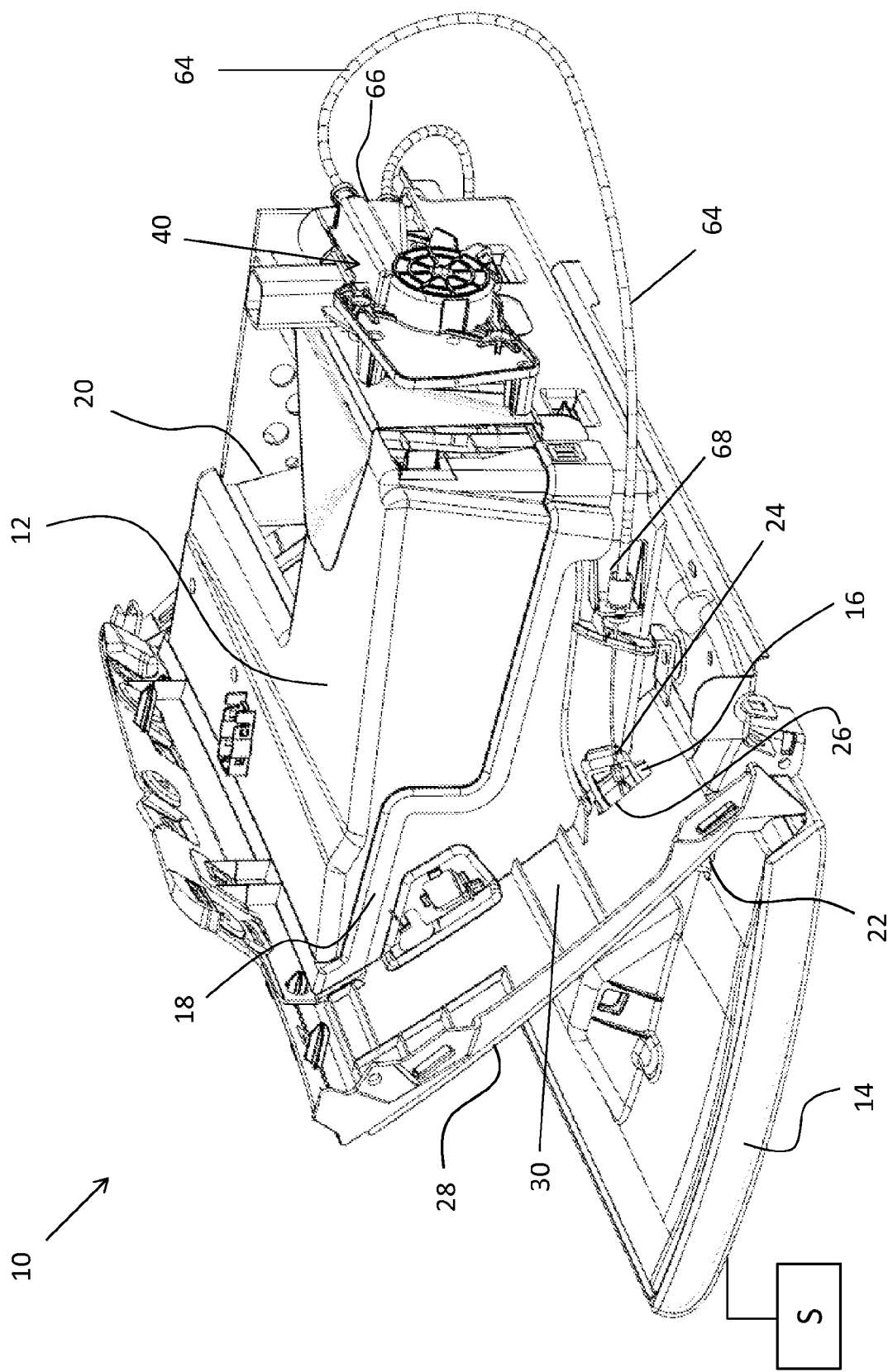
FIG. 2 is a rear perspective view of a glove box assembly in an open configuration according to an embodiment.

Referring now to FIGS. 1 and 2, an example of a compartment, such as a glove box assembly 10, is illustrated. The glove box assembly 10 includes a glove box housing 12 having a generally hollow interior or compartment (not shown). A glove box door or lid 14 coupled to the glove box housing 12 is transformable, such as rotatable for example, between a first closed position (FIG. 1) and a second, open position (FIG. 2) to selectively provide a user with access to the hollow interior of the housing 12.

In the illustrated, non-limiting embodiment, one or more glove box arms 16 couple the door 14 to the housing 12. As shown, the glove box assembly 10 includes a first arm 16 arranged adjacent a first side 18 of the housing 12 and a second arm (not shown) located adjacent a second, opposite side 20 of the housing 12. However, embodiments having a single arm or more than two arms are also contemplated herein. A first end 22 (best shown in FIG. 2) of each arm 16 is affixed to or integrally formed with a portion of the glove box door 14. A second end 24 of each arm 16 extends through an adjacent opening 26 formed in the housing 12. The glove box arm 16 is configured to move through the opening 26 as the glove box door 14 transitions or transforms between an open and closed position. For example, when the glove box door 14 is closed, as shown in FIG. 1, the first end 22 of the at least one arm 16 is sandwiched between the door 14 and a first side 28 (best shown in FIG. 2) of the housing 12, such that the majority of the arm 16 extends through the opening 26 and is located adjacent the backside 30 of the housing 12. When the glove box door 14 is open, as shown in FIG. 2, the second end 24 of the arm 16 directly abuts the backside 30 of the housing 12.

In an embodiment, at least one dimension of the second end 24 of the arm 16 is greater than a dimension of the opening 26 such that the second end 24 of the arm 16 is restricted from passing through the opening 26. Accordingly, engagement between the second end 24 of the arm 16 and the backside 30 of the housing 12 defines a stop position for rotation of the glove box door 14 into the open position. It should be understood that the at least one arm 16 illustrated and described herein is intended as an example only, and any suitable connection for movably mounting the door 14 to the housing 12 is within the scope of the disclosure.

The glove box assembly 10 includes a glove box actuation system 40 operable to selectively move the glove box door 14. In an embodiment, the glove box actuation system 40 is operable to move the glove box door 14 to a fully closed position. Further, the glove box actuation system 40 is operable to move the glove box door 14 to an open position. Although not shown, in some embodiments, the glove box assembly 10 may further include a latch configured to retain the glove box door 14 in the closed position. In some embodiments, the latch may be configured to assist in movement of the door 14 toward to closed position, such as by automatically cinching the door closed, once the door has rotated to a pre-closed position.

Figure 3:
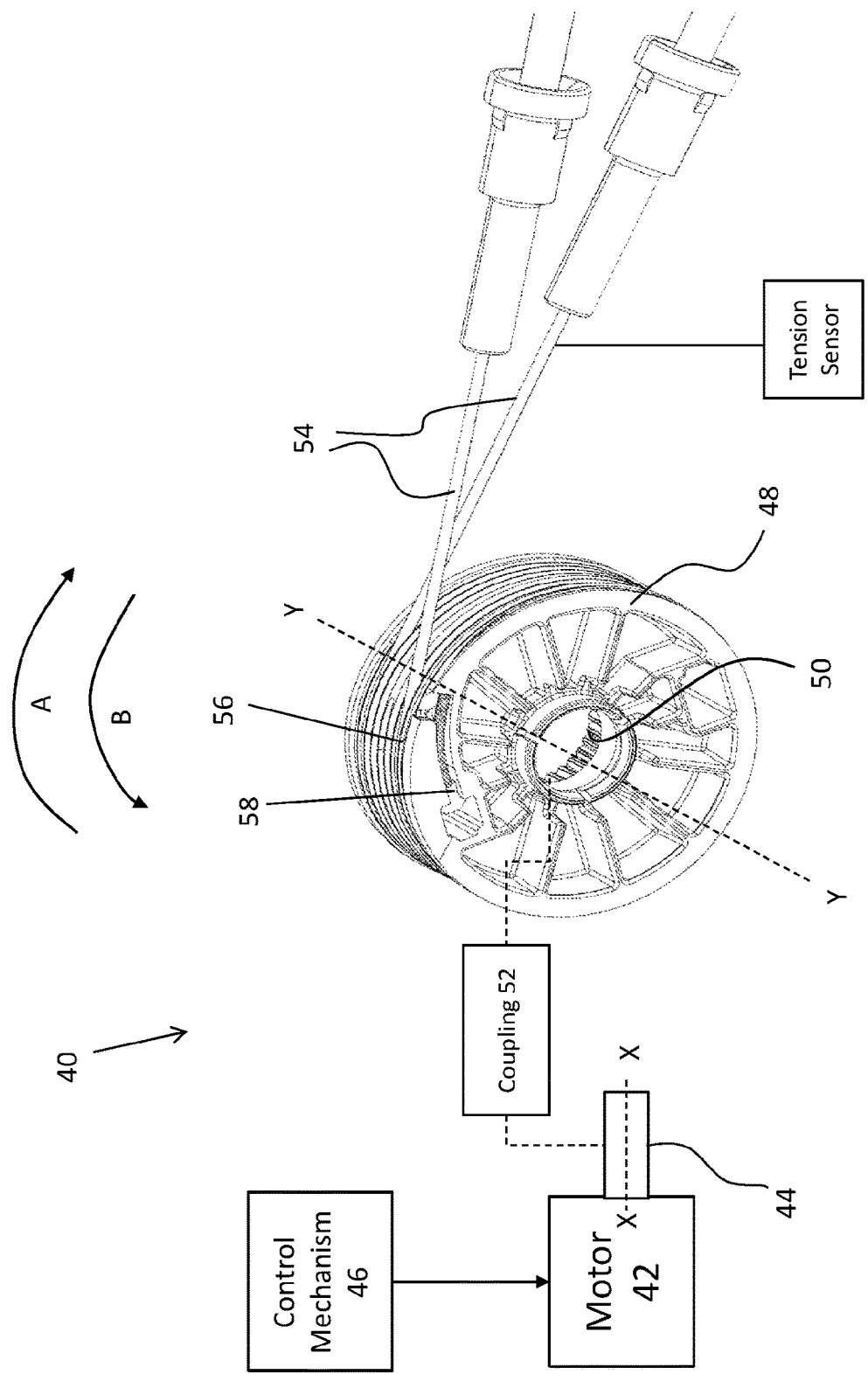
FIG. 3 is a perspective view of a portion of an actuation system of the glove box assembly according to an embodiment.
Figure 4:
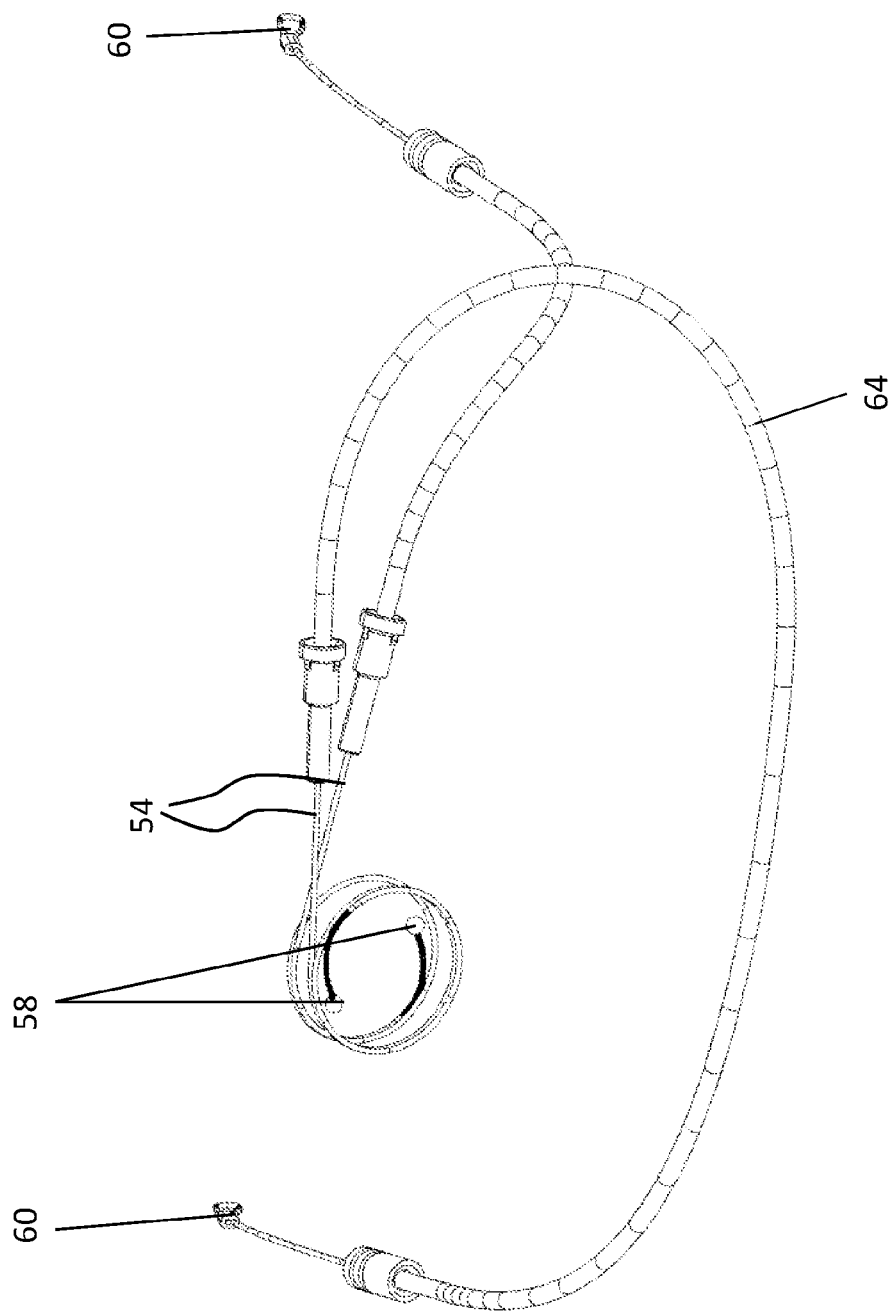
FIG. 4 is a perspective view of a plurality of cables of the actuation system of the glove box assembly according to an embodiment.
Figure 5:
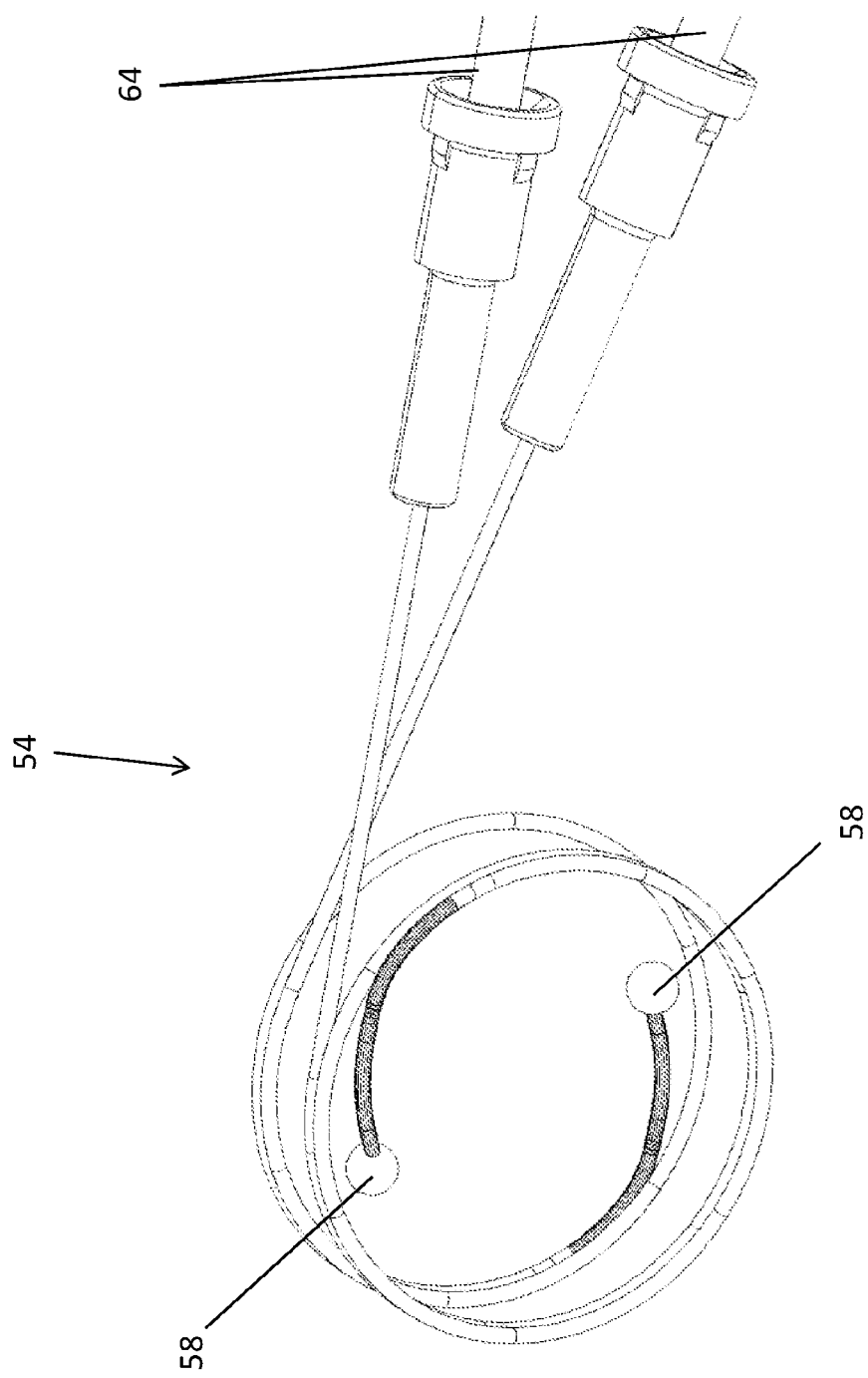
FIG. 5 is a perspective view of a first end of the plurality of cables shown in FIG. 4, according to an embodiment.
Figure 6:
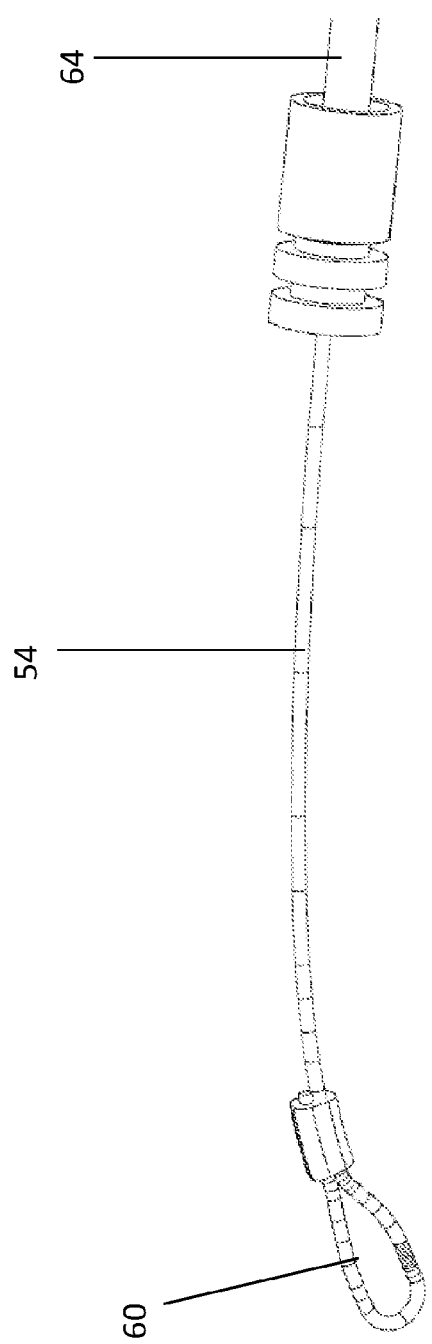
FIG. 6 is a perspective view of second end of the plurality of cables shown in FIG. 4, according to an embodiment.

The actuation system 40 generally includes a prime mover 42, such as a motor having a motor shaft 44 rotatable about an axis X for example. In an embodiment, actuation system 40, and more specifically the prime mover or motor 42, is operated in response to operation of a control mechanism, receipt of a signal, operation of a switch, or another equivalent means, illustrated schematically at 46. Referring now to FIGS. 3-5, an example of a glove box actuation system 40 is shown in more detail. In the illustrated non-limiting embodiment of FIGS. 3-6, in addition to the motor 42 and shaft 44, the actuation system 40 includes a drum 48 rotatable about a second axis Y. The second axis Y may be arranged parallel to the axis X of the motor shaft 44, or alternatively, may be arranged at an angle to the axis X of the motor shaft 44. In an embodiment, the rotatable drum 48 is directly driven about its axis Y by the motor 42. In another embodiment, the rotatable drum 48 may be indirectly coupled to the motor 42. For example, as best shown in FIG. 3, a portion of the drum 48 includes a plurality of gear teeth 50 such that the drum 48 may be connected to the motor 42 via a gear train 52. However, any other coupling or intermediate connection suitable for converting motion of the motor 42 into rotation of the drum 48 is considered within the scope of the disclosure. Further, although the actuation system 40 is illustrated and described herein as being mounted to the glove box housing 12, such as a rear surface thereof for example, embodiments where all or a portion of the actuation system 40 is coupled to or embedded within the glove box door 14 or an adjacent component are also contemplated herein.

In the illustrated, non-limiting embodiment, the actuation system 40 is a cable actuation system operable to selectively tension one or more cables 54 coupled to the glove box door 14. The one or more cables 54 are wound or unwound as the drum 48 rotates about its axis. As shown, one or more grooves 56 are formed in the outer periphery of the drum 48, and each of the one or more cables is receivable within the one or more grooves 56, respectively. The one or more grooves 56 may wrap more than 360 degrees about the drum 48. However, the overall length of the grooves 56 will depend on the diameter of the drum 48 and the total movement of the cables 54 required to transition between the open position and the closed position of the glove box door 14.

As shown, one or more cables 54 are affixed to the drum 48 at a first end 58, and coupled to a portion of the glove box door 14, such as a portion of a corresponding glove box arm 16 for example, at a second, opposite end 60. In the illustrated, non-limiting embodiment, best seen in FIGS. 1 and 2, the second end 60 of each cable 54 includes a loop mounted about a pin or post 62 protruding from the glove box arm 16. It should be understood that any cable end attachment like a cable seed in a recess, cable pinching or crimping directly on the arm 16, or via an adapter may be considered within the disclosure. Because the system 40 illustrated and described in the FIGS. includes two glove box arms 16, the illustrated actuation system 40 includes two cables 54. However, it should be understood that the actuation system 40 may include a single cable or more than two cables.

To protect each cable 54 of the actuation system 40 from damage and ensure proper translation, the majority of each cable 54 may be enclosed within a flexible conduit 64. The conduit 64 remains generally fixed within the assembly 10 and the cable 54 is configured to move relative to the conduit 64 via operation of the drum 48. In the illustrated, non-limiting embodiment, the conduit 64 extends between a housing 66 surrounding the drum 48, to an end bracket 68 mounted to a side of the housing 12, upstream from a corresponding glove box arm 16. In an embodiment, the end bracket 68 is positioned to ensure that the portion of the cable 54 upstream from the second end 24 remains generally aligned with the movable glove box arm 16.

Figure 7:
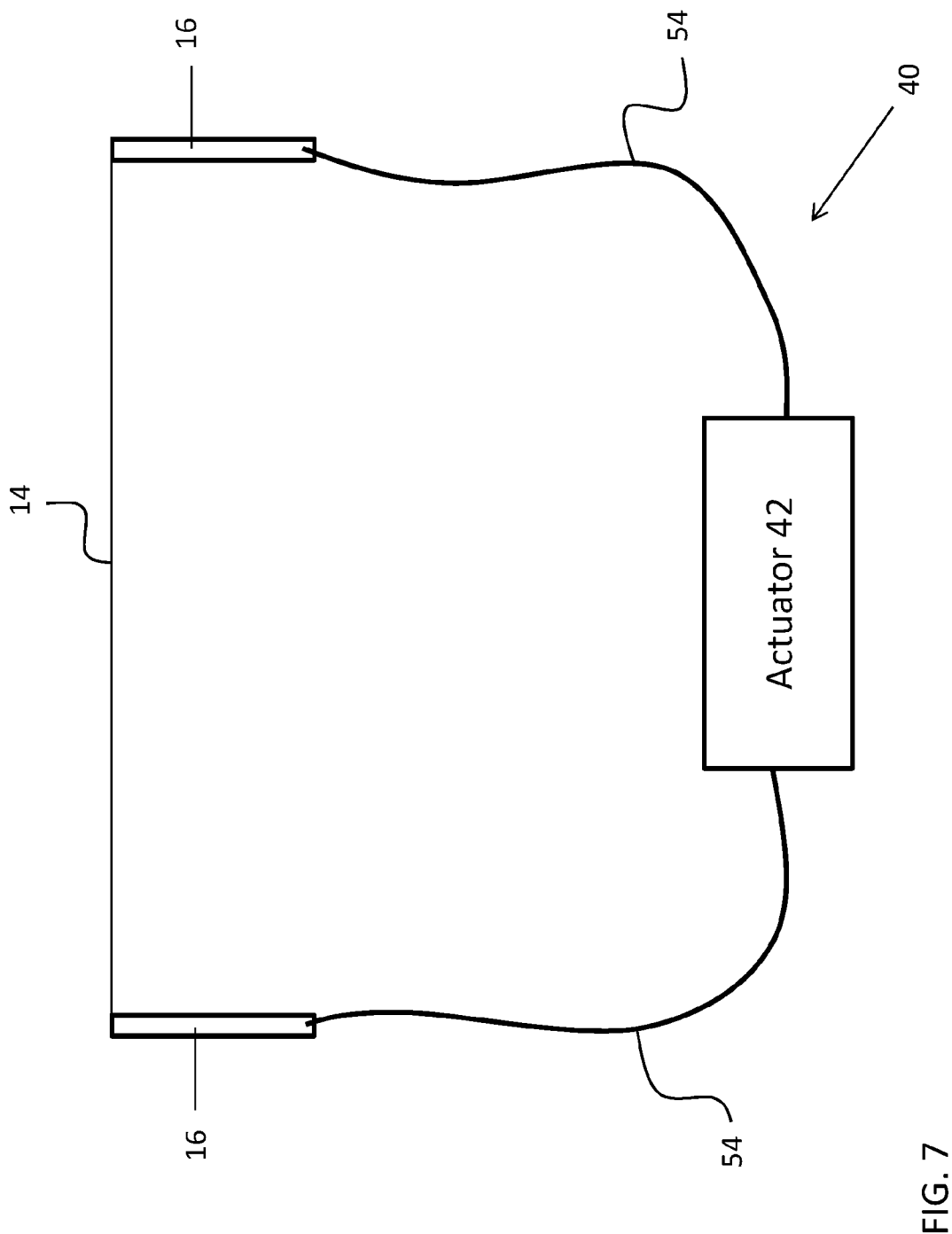
FIG. 7 is a schematic diagram of a portion of an actuation system of the glove box assembly according to an embodiment.

With reference now to FIG. 7, in another embodiment, the actuation system 40 is configured to continuously tension the one or more cables 54 coupled to the glove box door 14. In such embodiments, the prime mover 42 of the actuation system 40 may include one or more push-pull cable actuators, operably coupled to one or more cables 54 extending from the arms 16. In an embodiment, the push-pull cable actuator 42 may include a gear (not shown), such as a pinion for example, that directly drives movement of the cable 54 in both a first direction and a second, opposite direction. In such embodiments, an end of the cable 54 may be connected to a rack in intermeshing engagement with the gear. Further, it should be understood that in embodiments where the prime mover 42 is a push-pull cable actuator, each cable 54 may, but need not be enclosed within a flexible conduit 64 as previously described.

In yet another embodiment, best shown in FIG. 8, the actuation system 40 includes a motor 42 and a worm gear 70 driven by a worm 72 mounted to the motor shaft 44. The worm gear 70 may be coupled to a plurality of teeth or a feature 74 formed in or coupled to the arm 16. Although the worm gear 70 is illustrated as being directly coupled with the feature 74, embodiments where the worm gear 70 is indirectly coupled to the feature 74, such as via a gear train or other coupling for example, are also contemplated herein. Rotation of the worm gear 70 about an axis causes a similar rotation of the arm 16, and therefore the door 14, between the closed position (FIG. 8A) and the open position (FIG. 8B). It should be understood that the various actuation systems 40 illustrated and described herein are intended as an example only, and that any suitable actuation system 40 operable to selectively open and/or close the door 14 is within the scope of the disclosure.

With reference again to FIGS. 1-6, to close the glove box door 14 and seal the compartment of the housing 12, a signal is provided to the motor 42 from the control mechanism 46 or other equivalent means. In response to the signal, the motor 42 will operate causing the drum 48 to rotate in a first direction, indicated in the FIGS. by arrow A. As the drum 48 rotates about its axis Y from a first position, a portion of the one or more cables 54 wraps about the outer periphery of the drum 48. In embodiments where the drum 48 includes grooves 56, the one or more cables 54 are received within the grooves 56 as the drum 48 rotates. The drum 48 will rotate until reaching a second position where a desired amount of cable 54 has been taken up by the drum 48. Accordingly, this rotation of the drum functions to shorten or reduce the length of cable extending between the drum 48 and the glove box arm 16. The rotation of the drum 48 will apply a force to the cable 54, which is transferred from the second end 60 of the cable 54 to a corresponding glove box arm 16. This force pulls the glove box arm 16 through the opening 26 formed in the housing 12 until the glove box door 14 abuts against the surface 28 of the housing 12 or the door 14 is in a predefined closed position.

To open the glove box door 14, a signal is provided to the motor 42 from a switch 46 or other equivalent means. The signal to open the door 14 may be provided from the same switch 46, or alternatively, from a different switch as the signal to close the door 14. In response to the signal, the motor 42 will operate causing the drum 48 in the second position to rotate in a second, opposite direction, indicated in the FIGS. by arrow B. As the drum 48 rotates about its axis Y from the second position to the first position, a portion of the one or more cables 54 is unwound from the drum 48. Accordingly, this rotation of the drum 48 functions to increase the length of cable 54 extending between the drum 48 and the glove box arm 16. In an embodiment, the glove box door 14 is at a non-vertical orientation when in the closed position. With this configuration, the at least one cable 54 may generally oppose the force of gravity, such as to retain the door 14 in the closed position for example. By increasing the available length of the cable 54, the gravitational force acting on the door 14 may cause the door 14 to rotate or pivot towards the open position until the cable 54 opposes further rotation thereof and/or the second end 24 of the glove box arm 16 is in direct contact with the backside 30 of the housing 12.

To mitigate malfunction of the glove box assembly 10 in instances where a user manually moves the glove box door towards the closed position, it may be necessary to maintain a tension within the cables 54 of the automation system 40. In an embodiment, the glove box assembly 10 additionally includes a sensor or other mechanism 76 (see FIG. 3) for sensing the tension in the cables 54. When the sensed tension in the cable 54 falls below a predefined threshold, such as when the door 14 is manually moved for example, automatic operation of the actuation system 40 may be initiated to maintain the cables 54 under a desired tension. Accordingly, depending on the configuration of the assembly 10, it may be possible to define intermediate positions of the glove box door 14 relative to the housing 12, or to define an operation where the glove box door is moved to the fully closed position in response to manual movement by a user.

Alternatively, or in addition, the assembly 10 may further include one or more sensors, illustrated schematically at S, such as operably coupled to the door 14 for example. The sensor S may be operable to monitor a position of the door 14 relative to the housing 12 and initiate operation of the actuation system 40 in response to detected movement if the actuation system 40 is not active. In another embodiment, the sensor S may be a pressure sensor. If the door is rotated in response to application of a pressure by a user, the actuation system 40 may be automatically initiated in response to a signal generated by the sensor, such as to maintain alignment of the cables relative to the drum for example and take up cable slack in the system.

With reference now to FIGS. 7 and 8, in another embodiment, the manual movement of the door 14 may apply a load on the gears or coupling between the glove box arm 16 and the motor 42. Deflection of one or more of the gears or coupling may be sensed and initiate operation of the actuation system 40 to move the door 14 until the deflection signal stops or until a fully closed position of the door 14 is achieved.

To prevent operation of the actuation system 40 in response to unintended manual movement of the glove box door 14, such as due to involuntary hitting of the door 14 for example, an electronic or mechanical mechanism may be used to compensate for limited movements of the glove box door 12. For example, in an embodiment, a time delay may be implemented between detecting a reduced tension and operation of the actuation system 40. Alternatively, a biasing mechanism (not shown) may be coupled to the cable 54 and/or to the drum 48 to maintain a tension in the cable 54 even when the door 14 travels a limited distance towards the closed position.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without, departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A glove box assembly comprising:
    a glove box housing;
    a glove box door movable between a first, closed position and a second, open position relative to the glove box housing to selectively provide access to an interior of the glove box housing;
    an actuation system connected to the glove box door;
    a tension sensor for detecting manual movement of the glove box door, the tension sensor being operably coupled to the actuation system; and
    a control mechanism operably coupled to the actuation mechanism, wherein the actuation mechanism is operable in response to the control mechanism to move the glove box door to one of the closed position or the open position.

2. The glove box assembly of claim 1, wherein the actuation system further comprises:
    a prime mover;
    a coupling connecting a portion of the glove box door to the prime mover.

3. The glove box assembly of claim 2, wherein the portion of the glove box door is a glove box arm.

4. The glove box assembly of claim 2, wherein the coupling further comprises a gear train intermeshed with a feature formed in the portion of the glove box door.

5. The glove box assembly of claim 2, wherein the coupling further comprises:
    a drum driven about an axis of rotation by the prime mover; and
    at least one cable connected to the rotatable drum, wherein an unwound portion of the at least one cable extending between the drum and the glove box door is adjusted as the drum rotates between the first position and the second position.

6. The glove box assembly of claim 5, further comprising a gear train extending between the drum and the prime mover.

7. The glove box assembly of claim 5, wherein an end of the at least one cable includes a loop positioned about a post protruding from the glove box arm.

8. The glove box assembly of claim 5, further comprising a conduit surrounding at least a portion of the at least one cable.

9. The glove box assembly of claim 8, wherein the conduit is fixed and the at least one cable is movable relative to the conduit.

10. The glove box assembly of claim 5, wherein as the drum rotates in a first direction, the at least one cable is wound about the drum, and the glove box door is moved towards the first, closed position.

11. The glove box assembly of claim 5, wherein the at least one cable is received within a groove formed in the outer periphery of the drum.

12. The glove box assembly of claim 5, wherein as the drum rotates in a second direction, the at least one cable is unwound from the drum, and the glove box door is moved towards the second, open position.

13. The glove box assembly of claim 2, wherein the coupling further comprises:
    a pinion gear driven by the prime mover; and
    at least one push pull cable engaged with the pinion gear, wherein operation of the prime mover rotates the pinion gear, such that the at least one push pull cable is adjusted between a first position and a second position.

14. The glove box assembly of claim 2, wherein the tension sensor is operably coupled to at least one of the prime mover and the coupling connecting the portion of the glove box door to the prime mover.

15. The glove box assembly of claim 2, wherein the tension sensor is mounted to the glove box door.

16. The glove box assembly of claim 2, wherein operation of the actuation system is initiated in response to movement of the glove box door detected by the tension sensor.

17. A method of operating a glove box assembly comprising:
generating a signal to transform a glove box door of the glove box assembly between an open position and a closed position;
operating a prime mover of an actuation system in response to the signal; and
adjusting a force applied by a coupling extending between the prime mover and the glove box door to transform the glove box door to one of the open position and the closed position, wherein adjusting the force applied by the coupling further comprises rotating a drum to adjust a length of at least one cable extending between the drum and the glove box door of the glove box assembly, wherein at least a portion of the length of the at least one cable is received within a groove formed in an outer periphery of the drum.

18. The method of claim 17, wherein rotating the drum via operation of the prime mover in a first direction increases a length of the at least one cable extending between the drum and the glove box door causing the glove box door to transition from a closed position to an open position.

19. The method of claim 17, wherein rotating the drum via operation of the prime mover in a second direction shortens the length of the at least one cable extending between the drum and the glove box door causing the glove box door to transition from the open position to a closed position.

20. A glove box assembly comprising:
a glove box housing;
a glove box door movable between a first, closed position and a second, open position relative to the glove box housing to selectively provide access to an interior of the glove box housing;
an actuation system connected to the glove box door further comprising:
a prime mover;
a drum driven about an axis of rotation by the prime mover; and
at least one cable connected to the rotatable drum, the at least one cable being receivable within a groove formed in an outer periphery of the drum, wherein an unwound portion of the at least one cable extending between the drum and the glove box door is adjusted as the drum rotates between the first position and the second position, a portion of the at least one;
a control mechanism operably coupled to the actuation mechanism, wherein the actuation mechanism is operable in response to the control mechanism to move the glove box door to one of the closed position or the open position.

* * * * *